455-601
2/25/86    AU 263    EX
           XR    4,573,214

United States Patent [19]
Mooradian

[11] Patent Number: 4,573,214

[45] Date of Patent: Feb. 25, 1986

[54] SATELLITE MOUNTED SYSTEM FOR TRANSFERRING INFORMATION USING MODULATED SUNLIGHT

[75] Inventor: Gregory C. Mooradian, Del Mar, Calif.

[73] Assignee: The United States of America as represented by the Secretary of the Navy, Washington, D.C.

[21] Appl. No.: 234,059

[22] Filed: Feb. 12, 1981

[51] Int. Cl.⁴ ............................ H01Q 1/28; H04B 9/00
[52] U.S. Cl. ...................................... 455/605; 455/601; 455/614; 343/DIG. 2
[58] Field of Search .................. 343/DIG. 2, 100 ST; 455/600, 601, 605, 614, 618

[56]        References Cited
         U.S. PATENT DOCUMENTS
3,150,320   9/1964   Gruenberg ................... 343/DIG. 2
3,340,530   9/1967   Sullivan et al. .............. 343/DIG. 2

Primary Examiner—Eli Lieberman
Attorney, Agent, or Firm—R. F. Beers; Ervin F. Johnston; Thomas Glenn Keough

[57]              ABSTRACT

A method and apparatus for broadcasting, transferring and disbursing information from space to earth uses sunlight as the carrier. An orbiting platform receives sunlight and modulates it with electromagnetic signals carrying the information beamed up from an earth station, communications satellite or aircraft. The modulated sunlight is directed to a designated area on earth from the orbiting platform where it penetrates clouds as well as seawater to reach surface and submerged receiving stations including submarines.

10 Claims, 5 Drawing Figures

SATELLITE MOUNTED SYSTEM FOR TRANSFERRING INFORMATION USING MODULATED SUNLIGHT

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

This invention relates to related technology application copending by Gregory C. Mooradian and entitled "Balloon Collector/Director Sunsubsatcom Concept", NC 65,119, U.S. Patent and Trademark Office Ser. No. 239,254.

BACKGROUND OF THE INVENTION

Over the years a variety of communication systems have evolved which, to one degree or another, provide for reliable world-wide communications. VLF and ULF radio communication systems have long proven their worth, yet they have some limitations. Their susceptibility to jamming and their inability to penetrate seawater effectively have limited other usefulness for high priority communications.

The technological advances of space exploration have made available orbiting space platforms and recent advances in laser technology have provided a number of new communication devices. A marriage between these technologies logically is foreseen to provide a more reliable high-priority communication system.

Modulatable blue/green energy penetrates cloud covers and a considerable depth in seawater. The highly directability of blue/green lasers and their location on orbiting platform reduces the possibility of outside electromagnetic interference so that it would appear an orbiting laser system would satisfy the need for reliable wisespread communications.

Unfortunately, the technological expectations have not come to be. The current family of lasers and their related equipments lack the efficient, long-life, high-peak power, and high-average power requirements for space-qualified laser sources. High-transmission, wide-angle narrow-band optical filtering arrangements suitable for the subsurface platform also are lacking. Although the existing lasers and filters have some degree of flexibility, they are not refined to the point for optimizing transmission through different types of water. In addition, the state-of-the-art fails to provide for sufficient spacecraft offboard sight pointing of the narrow laser beam which would be directed at a specific submerged receiver. Similarly, most of the characteristics of a laser that enhance performance in conventional optical communications systems are so degraded by the satellite-to-subsurface propagation channel, that utilization of the advantages are difficult, the transmission channel through the clouds and seawater so degrades the nature of the transmitted laser pulse spatially, angularly and temporally that photon detection in the presence of background noise is difficult even with projected components. The nature of the cloud/ocean channel is foreseen to require additional receiver and transmitter complexity that might even further degrade performance. The channel adversely influences the system's performance, by, first, degrading the received pulse and by, second, degrading component capabilities required to detect the pulse.

Typically, the characteristics of a laser which normally serve to greatly enhance communication performance might be a disadvantage in communicating with widely scattered submerged receivers. The narrow spectral emission of the laser, the narrow pulse widths and high peak powers for discriminating against solar background, the narrow beam widths (small spot size) to concentrate energy density, and the narrow angular source size (light appearing to come from only one direction) could be considered as disadvantageous to a worldwide communication system that seeks to avoid betraying the submerged receivers' locations. Furthermore, the monochromatic nature of laser light allows high water transmission and a narrow optical prefiltering of solar background only if a narrow band, wide-angle filter can be constructed and, only if it can be obtained at the correct wavelength matching both the laser wavelength and the optimum water transmission wavelengths.

Collimated laser beams are useful only if a means exists to off-boresight point the beams and if the area coverage requirements permit their use and if the clouds do not further spread the beam. Enhancement due to "blue sky" Rayleigh scattering contributions at large zenith angles are also lost with small spot sizes. In like manner the narrow pulses possible with lasers permit gating out of most daytime background radiation but only if clouds do not stretch the pulse to values approaching 100 microseconds. The angular spreading due to both clouds and the ocean make the optical energy appear to come from virtually all forward directions which again severely limits narrowband detection. From the foregoing it is apparent that the orbiting of a modulatable laser light source poses formidable obstacles to actual implementation.

Thus, there is a continuing need in the state-of-the-art for a reliable optical communications system having regional and worldwide coverage which is relatively nonjammable and reliably transmits information through cloud cover and seawater to a submerged receiver.

SUMMARY OF THE INVENTION

The present invention is directed to providing a method and apparatus of transferring information from space to earth. The method of the invention calls for the orbiting of a platform within the earth's gravitational field and receiving sunlight on the orbiting platform. Modulating the received sunlight with information from electromagnetic signals transmitted to the orbiting platform from earth and directing the modulated sunlight back to earth assures reliable communications. Providing a source of power on the orbiting platform from the sunlight assures the long-term, trouble-free modulating of the received sunlight.

The apparatus of the invention includes a means for orbiting a platform within the earth's gravitational field and providing a sunlight receiving means on the orbiting platform for being modulated by a modulating means also carried on the platform. A directing means is mounted in optical communication with the receiving means and modulating means for directing the modulated signals through cloud cover and seawater to submerged receivers. Use of a modulated flat mirror is also possible.

A prime object of the invention is to provide an improved communication system.

Still another object is to provide an orbiting communication system employing sunlight as a modulated carrier.

Still another object of the invention is to provide an orbiting platform modulating received sunlight to penetrate cloud cover and seawater.

A further object of the invention is to provide a communication system that broadcasts modulated received sunlight over a wide area so as not to betray the location of a receiving station.

Still another object is to provide an orbiting platform for modulating received sunlight and redirecting it to earth that relies on the sun's power for operation.

Still a further object is to provide a method for assuring widespread reliable communication.

A further object is to provide a reliable sunlight modulating method for penetrating cloud cover and seawater to submerged receiving stations including submarines.

Yet a further object is to provide a method of modulating received sunlight by an orbiting platform that is responsive to earth originating information via electromagnetic modulating signals to accordingly modulate the received sunlight and redirect it to earth.

These and other objects, advantages and novel features of the invention will become apparent from the following detailed description of the invention when considered in conjunction with the accompanying drawings.

DESCRIPTION OF THE PREFERRED EMBODIMENT

Figure 1:
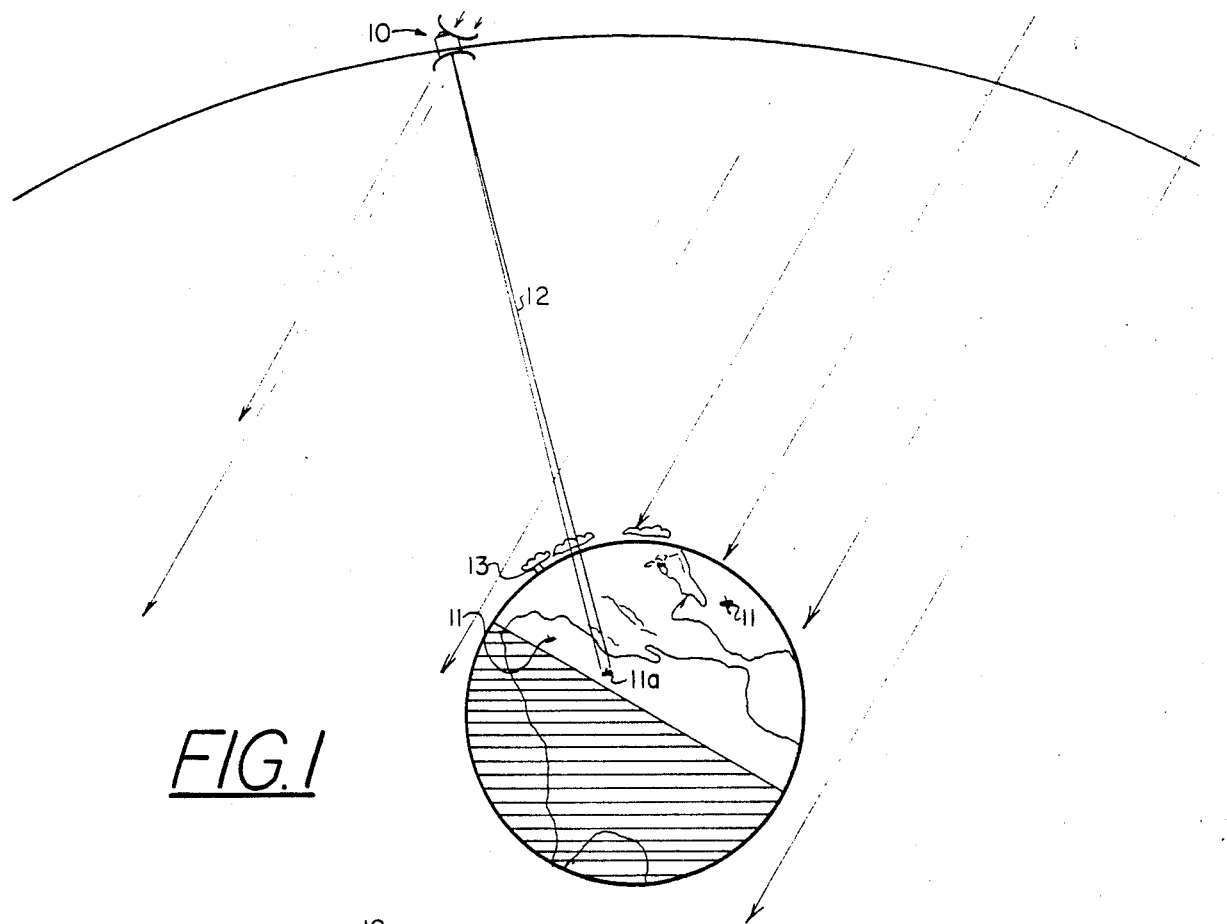
FIG. 1 is an isometric depiction of the method and apparatus of the invention operatively disposed for daytime operation.
Figure 2:
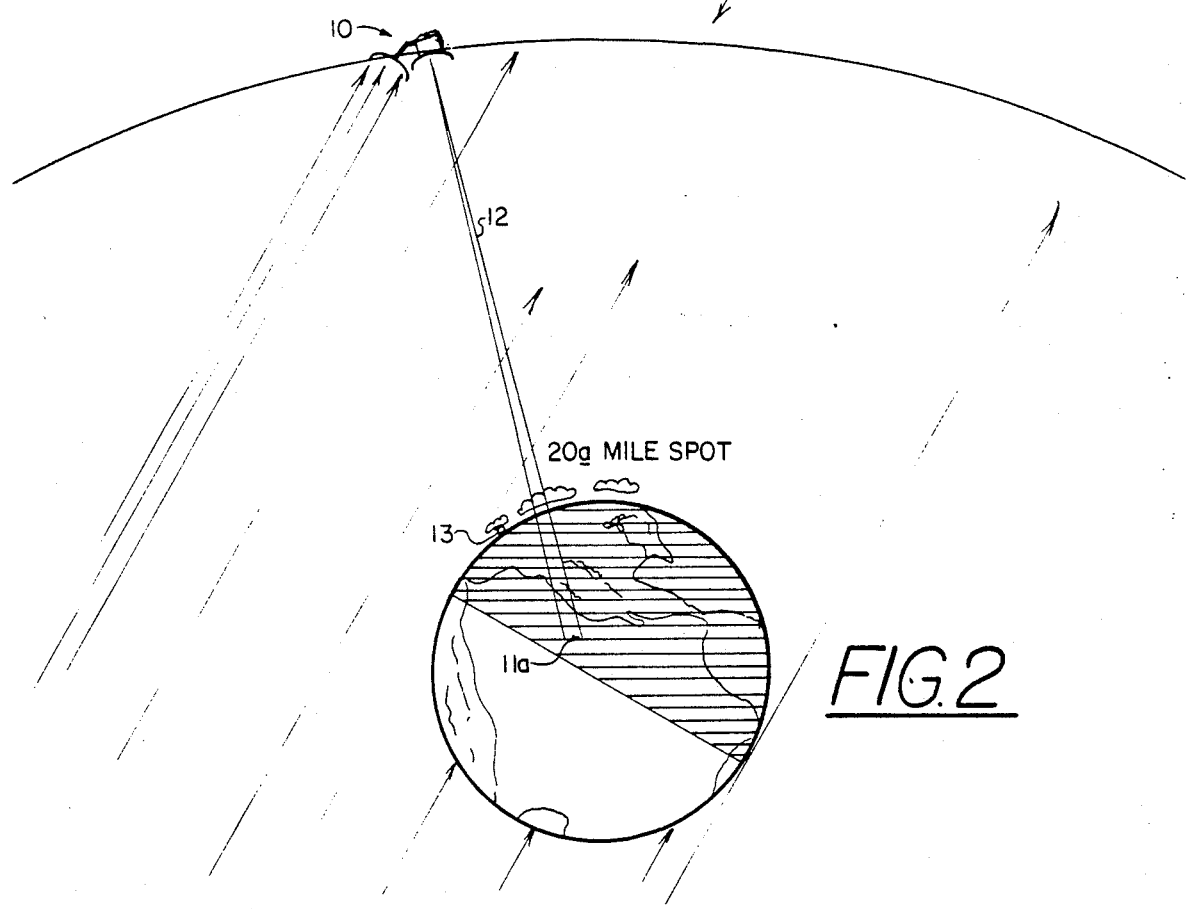
FIG. 2 is a schematic depiction of the invention operatively disposed to assure reliable nighttime operation.

Referring to FIGS. 1 and 2 of the drawings an orbiting platform 10 travels in its path around the earth. The orbit could be synchronous with the earth's rotation so that both daytime, FIG. 1, and nighttime, FIG. 2, a relative disposition with respect to a location on the earth's surface will be maintained by an orbiting platform. In practice, a multiplicity of such orbiting platforms are located at appropriate spacings to assure world-wide, or at least a widespread, communication with a number of receiving stations 11. Also, a number of satellites will eliminate outages due to shadowing from the earth.

The individual orbiting platforms each are so designed to communicate with a particular receiving station 11a, see FIG. 1, within a spot. A cone 12 of optical transmission is radiated from the orbiting platform and defines an area within which a receiver can pick up the relayed information. The size of this area is variable and is adjusted to accommodate the offsetting requirements of signal strength and signal dispersion, the former being of interest for penetration of cloud cover and seawater and the latter for covertness and reliability. To broadcast to a large area the downlink spots are used to cover the area in a sequential manner.

In theory, from a synchronous satellite a cone having a diameter of approximately two-hundred miles will transmit blue/green information through cloud cover and into a considerable depth of seawater. This size area does not disclose the exact location of a receiving station since a station can be anywhere within this area to receive the transmitted information. Also, a number of spot areas may be targeted for transmission. A conventional laser using scanning techniques is incapable of illuminating such a large spot, primarily because of the excessive power requirements. The orbiting platform and method of communicating to be described fill this specific need using the virtually unlimited power supply provided by the sun.

Figure 3A:
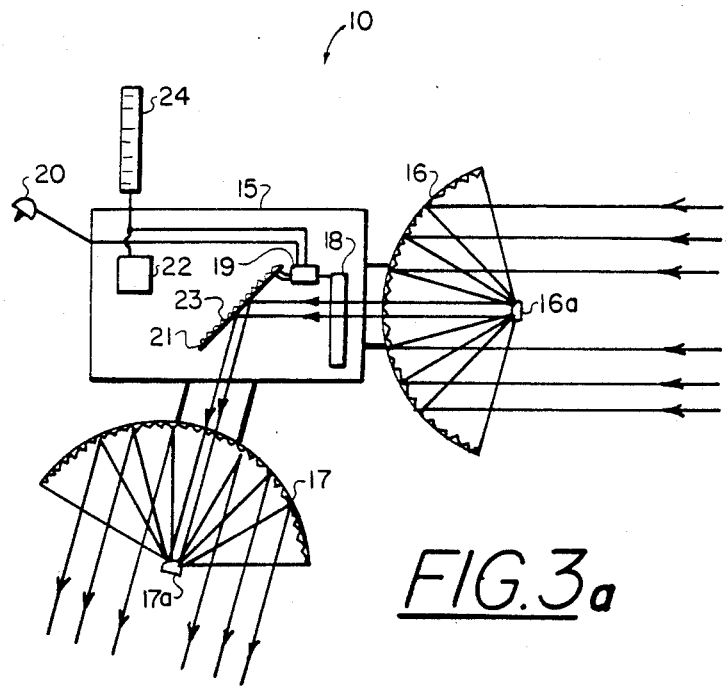
FIG. 3a depicts a representation of the apparatus of the invention for modulating received sunlight.

Looking to FIG. 3a, a platform member 15 supports a large sunlight receiving surface 16 and a sunlight redirecting surface 17. The receiving surface is a large reflective surface and, in one embodiment, is a parabolic or hemispherically-shaped mirrored surface suitably oriented to receive impinging sunlight. A collector lens arrangement 16a concentrates and collimates the impinging sunlight and directs it along an optical path on the platform member.

An optical modulator 18 is interposed in the optical path and changes the intensity, or interrupts the optical path in accordance with modulation information signals.

The modulator, optionally is any of a number of light modulators currently available. A liquid crystal panel could be interposed; an electro-optical modulator; a shutter-like heliograph might be used; an electro-mechanical device for changing the curvature of 16a; any device for light modulation may be substituted which is responsive to electromagnetic signals. The modulation signal is a preprogrammed set of instructions carried in an instrumentation package 19 on the platform member or, better still, is the direct coupling of a radio receiver in the instrumentation package to a microwave antenna 20. The microwave antenna is pointed at an earthbound electromagnetic energy transmitting station 13 and allows a real time update and communication with the dispersed receiving stations 11. In either case the functions of the earth originating or preprogrammed instruction signals are such as to vary and otherwise interrupt concentrated sunlight so as to convey the information content of the modulating signals.

After the light has been modulated, it is channeled by a flat mirror 21 to a mirror arrangement 17a. The mirror arrangement may be a suitable type well known in the art which uniformly spreads the modulated sunlight on the reflective, redirecting surface 17. The redirecting surface is a mirrored surface properly configured and arranged with respect to the mirror arrangement to project the desired beam of modulated sunlight. Note, the elements 16 and 17 and 16a and 17a could well be identical.

Orientation of the receiving surface 16, flat mirror 21 and directing mirror surface 17 with respect to the sun and an area for illumination on earth are controlled by a suitably connected navigation-maneuvering package 22. Servo mechanism guided corrections to assure the proper orientation are routinely made in response to remotely originating command signals or the instructions carried in instrumentation package 19. This capability has been well demonstrated by numerous satellites and space probes in recent years.

Although FIG. 3a shows modulator 18 interposed in the light path, reflecting mirror 21 could be modified to include a backing 23 that is coupled to the instrumentation package 19. This backing might include a shuttered arrangement of the type used in heliograph transmission, a liquid crystal light valve or similar well known device.

The apparatus disclosed is suitable for long-term operation and uses freely available sunlight to transmit information optically to a preselected area. A solar panel 24 optionally is included to further extend the life of the orbiting platform and to avoid any problems normally associated with on-board power supplies. The panels are appropriately connected to assure that all the power requirements on the orbiting platform also come from sunlight.

Figure 3B:
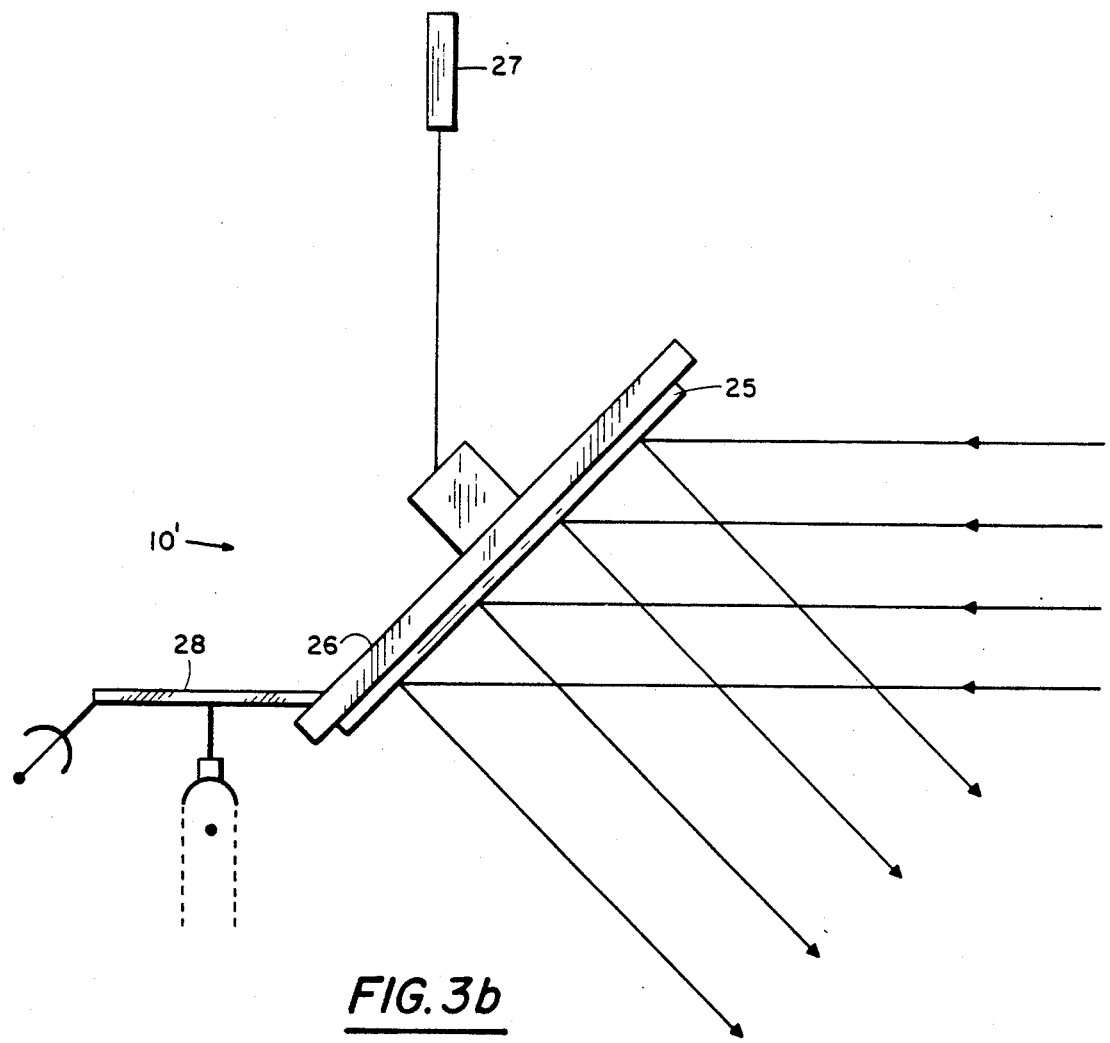
FIG. 3b shows another apparatus for broadcasting modulated sunlight.

A modification of the orbiting platform 10' is shown in FIG. 3b. A flat plate modulator 25 mounted on a large mirror structure 26 receives, modulates, in the manner described above, and reflects the modulated sunlight to a designated area. A combination solar cell-sensor package 27 provides power for the platform and assures that it is oriented to receive sunlight and direct it toward its designated earth area. An antenna-modulator package 28 receives electromagnetic signals.

Figure 4:
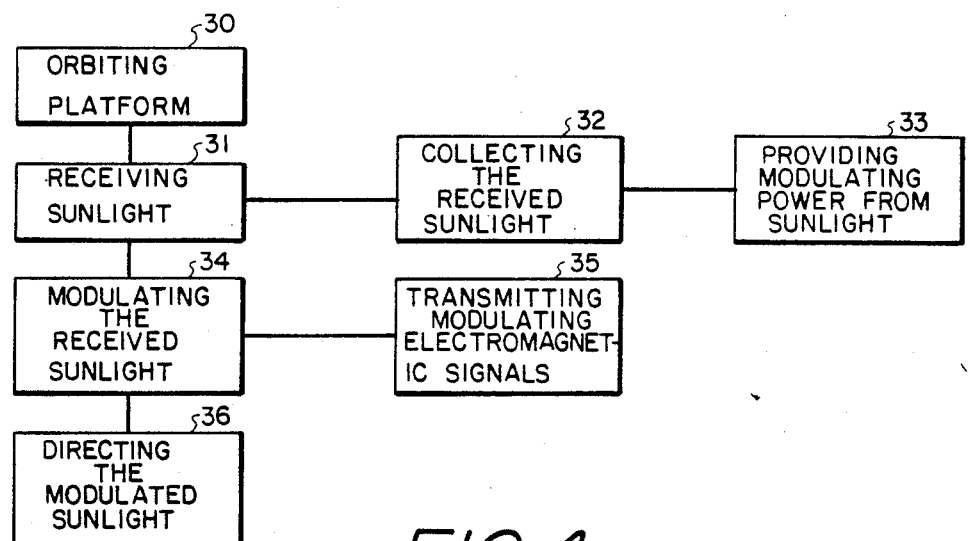
FIG. 4 is a block diagram representation of the method of assuring modulation of received sunlight.

What has been described above is the apparatus for assuring the optical transmission of information via modulated sunlight. The method of transmitting such information can be better understood by noting FIG. 4.

First, there is an orbiting 30 of a platform within the earth's gravitational field to maintain a certain station or to achieve a synchronous orbit. A receiving 31 of sunlight emanating from the sun enables a collecting 32 of received sunlight for a subsequent modulating procedure. The ever-present sun also assures providing 33 of sufficient power for the orbiting platform to take care of command, control and orienting responsibilities as well as assuring that subsequent processing of the received sunlight will occur. Next there is a modulating 34 of the received sunlight in accordance with any one of a variety of conventional means for altering, diminishing, interrupting, etc., the travel of light in an optical path on the platform. Signals for modulating the received sunlight can originate from a preprogrammed on-board package which also serves to orient the orbiting platform or, can come from an earthbound station which effects a transmitting 35 of modulating electromagnetic signals to the orbiting platform.

Following the modulation of the received sunlight there is a directing 36 of the modulated sunlight toward a predetermined area on earth. The modulated sunlight has the capability for penetrating cloud cover and a certain depth of seawater to assure communication with surface and subsurface receivers. The steps 31, 34 and 36 could also be performed by a modulated flat reflector.

Obviously many modifications and variations of the present invention are possible in the light of the above teachings. It is therefore to be understood that within the scope of the appended claims the invention may be practiced otherwise than as specifically described.

What is claimed is:

1. A method of transferring information via modulated sunlight from space to earth comprising the steps of:
   orbiting a platform within the earth's gravitational field;
   receiving sunlight on the orbiting platform;
   modulating the received sunlight on the orbiting platform; and
   directing the modulated sunlight to earth.

2. A method according to claim 1 further including the step of:
   transmitting information via electromagnetic signals to the orbiting platform from earth to effect the modulating of the received sunlight.

3. A method according to claim 2 further including the step of:
   collecting the received sunlight to concentrate it for modulating.

4. A method ccording to claim 3 further including the step of:
   providing a source of modulating power on the orbiting platform from sunlight.

5. A method according to claim 4 in which the step of modulating includes altering the transmissivity of a light path on the orbiting platform.

6. An apparatus for transferring information from space to earth via modulated sunlight comprising:
   means for orbiting a platform within the earth's gravitational field;
   means carried on the orbiting platform means for receiving sunlight;
   means carried on the orbiting platform and in optical communication with the receiving means for modulating the received sunlight; and
   means carried on the orbiting platform and in optical communication with the receiving means and modulating means for directing the modulated sunlight to earth.

7. An apparatus according to claim 6 further including:
   means for transmitting electromagnetic signals to the orbiting platform from earth to effect the modulation of the received sunlight.

8. An apparatus according to claim 7 further including:
   means carried on the platform for collecting the received sunlight to concentrate it for modulating the received sunlight.

9. An apparatus according to claim 8 further including:
   means carried on the orbiting platform for providing a source of power from the orbiting platform from sunlight.

10. An apparatus according to claim 9 in which the modulating means includes a means for altering the transmissivity of a light path on the orbiting platform.

* * * * *